United States Patent
Rhodes et al.

(10) Patent No.: US 8,220,802 B2
(45) Date of Patent: Jul. 17, 2012

(54) LEAF SEAL, IN PARTICULAR FOR A GAS TURBINE, AND METHOD OF PRODUCING IT

(75) Inventors: Nigel Anthony Rhodes, Newbold Verdon (GB); Matthias Hoebel, Windisch (CH); Walter Brehm, Gebenstorf (CH); Alexander Schnell, Ennetbaden (CH)

(73) Assignee: Alstom Technology Ltd., Baden (CH)

( * ) Notice: Subject to any disclaimer, the term of this patent is extended or adjusted under 35 U.S.C. 154(b) by 1327 days.

(21) Appl. No.: 11/537,211

(22) Filed: Sep. 29, 2006

(65) Prior Publication Data

US 2007/0120326 A1    May 31, 2007

Related U.S. Application Data

(63) Continuation of application No. PCT/EP2005/051351, filed on Mar. 23, 2005.

(30) Foreign Application Priority Data

Mar. 30, 2004   (DE) .................. 10 2004 016 173

(51) Int. Cl.
    *F16J 15/447*   (2006.01)
(52) U.S. Cl. ................. 277/412; 277/417; 277/421
(58) Field of Classification Search .................. 277/411, 277/412, 421, 417
    See application file for complete search history.

(56) References Cited

U.S. PATENT DOCUMENTS

| RE30,206 E | * | 2/1980 | Ferguson et al. .......... 415/173.7 |
| 4,618,152 A | | 10/1986 | Campbell |
| 5,597,167 A | | 1/1997 | Snyder et al. |
| 5,944,320 A | | 8/1999 | Werner et al. |
| 6,267,381 B1 | * | 7/2001 | Wright .......................... 277/355 |
| 6,343,792 B1 | | 2/2002 | Shinohara et al. |
| 2007/0119909 A1 | * | 5/2007 | Rhodes ........................ 228/164 |

FOREIGN PATENT DOCUMENTS

| DE | 3335570 | 7/1984 |
| DE | 19712088 | 10/1998 |

* cited by examiner

*Primary Examiner* — Alison Pickard
(74) *Attorney, Agent, or Firm* — Leydig, Voit & Mayer, Ltd.

(57) ABSTRACT

A leaf seal for sealing a shaft rotating about an axis, in particular in a gas turbine, includes a plurality of spaced-apart leaves arranged in a concentric circle around the axis and fixed in position by brazing, the leaves having surfaces oriented essentially parallel to the axis. The leaves are brazed to one another via intermediate spacers made of a brazing foil, so that a brazed joint is produced by brazing alloy from the brazing foils. The brazing temperature may be set to an optimum value just above the solidus temperature of the brazing foil, at which partial melting of the brazing foil occurs and penetration of liquid brazing alloy into the gap between the leaves is avoided.

10 Claims, 4 Drawing Sheets

LEAF SEAL, IN PARTICULAR FOR A GAS TURBINE, AND METHOD OF PRODUCING IT

Priority is claimed to German Patent Application No. DE 10 2004 016 173.9, filed on Mar. 30, 2004, the entire disclosure of which is incorporated by reference herein.

The present invention relates to the field of sealing in rotating machines. It relates to a leaf seal for sealing a shaft about an axis, in particular in a gas turbine, and to a method of producing such a leaf seal.

BACKGROUND

A gas turbine includes a rotor, on which various stages with compressor blades and turbine blades are provided, and of a stator housing. The rotor is mounted in bearings at each end of the rotor shaft.

The control of the gas flow inside the gas turbine is of paramount importance with regard to both the functionality and the effectiveness. Sealing techniques are used at various locations along the rotor shaft in order to reduce the axial gas flow along the shaft. This is especially important next to the bearings in order to prevent the oil which is used in the bearings from overheating due to the hot gases of the gas flow.

Two types of sealing techniques are traditionally used in this situation—usually alternatively, sometimes also in combination. These are labyrinth seals and brush seals.

Labyrinth seals have no metal-to-metal contact between the rotor and the stator; the sealing effect is therefore relatively small. However, they offer the advantage of low rotational friction and of a therefore virtually unlimited service life.

On the other hand, brush seals have higher friction losses on account of the friction between the bristle ends and the rotor shaft. This results in wear, which limits the service life of the seal. However, brush seals stem the axial gas flow more effectively, in particular in the case of higher axial pressure differences.

The use of these techniques for sealing in gas turbines has numerous restrictions. Firstly, the axial pressure difference that they can withstand is still fairly low. In the case of the brush seals, this is due to the bristles, which have the same stiffness in the axial and circumferential directions: high pressures can cause the bristles to blow back on themselves in the axial direction. The capability of the seals to allow a significant radial movement and to resist it is also low.

The design of a brush seal is often a compromise between the use of a supporting plate, which is intended to give sufficient axial support, and the non-restriction of the radial movement.

In order to avoid the disadvantages of the known brush seals, a leaf seat has been proposed in U.S. Pat. No. B1-6,343,792, this leaf seal performing the same function as either a labyrinth seal or a brush seal but having the advantages of both. Instead of the bristles, which are produced from wires of circular cross section, thin metal leaves are assembled in a certain arrangement (see, for example, FIG. 3 of U.S. Pat. No. B1-6,343,792 or FIG. 1 of the present application). The leaves, which are oriented with their surfaces essentially parallel to the axial direction, are much stiffer in the axial direction than in the circumferential direction. Thus the seal can withstand higher pressure differences without restricting their possibilities for allowing radial movements. The wide region on the rotor, which is swept by the tips of the leaves, provides the opportunity of producing a hydrodynamic force during operation, and this hydrodynamic force can separate the leaf tips from the shaft. In this way, a distance of a few microns can be produced and maintained, so that the wear, the friction heat and the friction losses can be reduced virtually to zero.

The basic design relates to a number of thin metal leaves which have a controlled air gap between them and are fastened at a predetermined angle to the radius. The air gap is a critical design parameter: it enables an air flow to occur in order thus to produce the hydrodynamic effect; however, it must not be so large as to allow an excessive axial air flow.

Two variants of leaf spring designs are possible: in the one variant the leaves are blown downward, but in the other they are blown upward. In the variant having the leaves blown downward, there is a distance between the leaf tips and the shaft during the assembly and start-up, and this gap is reduced to very small values by the use of an air flow between the leaves. On the other hand, in the variant having the upward blowing, there is slight mutual influencing between the leaf tips and the shaft during the start-up, and a distance is produced when the shaft is accelerated. In both cases, the flow of the medium through the air gaps between the leaves is critical, as is the control of the seal's inside diameter, which is produced by the leaf tips.

The air flow through the leaves can be varied by using a front and a rear plate which leave a narrow gap free between the surfaces of the leaf stack and the plates (see abovementioned FIGS. 1 and 3). A careful design of these geometries makes it possible to control the upward or downward blowing effects. It may also be desirable to assist the downward blowing effect by an active pressure feed along the length of the leaves or inward from the front side or from the rear directions.

One of the other main advantages of the leaf seal concept is a greater tolerance of the radial movement than in labyrinth or brush seals. This requires a large distance there between the inside diameter of the front and rear end plates and the shaft.

Depending on the geometry selected for the seal and on the diameter of the shaft to be sealed, the number of leaves can be several thousand or umpteen thousand. The accuracy with which said leaves can be produced, assembled and connected, in the course of which a reproducible air gap between each pair of leaves is ensured, is critical for the successful implementation of every possible seal design.

The joining method for fixing the leaves in their position could be a mechanical technique, such as clamping in place, welding or brazing or any possible combination thereof. It is quite obviously important that a minimum disturbance of the leaves or of their relative positions occurs during the joining process.

Various joining methods have already been proposed in the abovementioned publication U.S. Pat. No. B1-6,343,792. In the exemplary embodiments pertaining to FIGS. 1 to 21 of the publication, the leaves, with their top transverse edge, are brazed in place in a housing. No further details are given with regard to the brazing process in particular.

SUMMARY OF THE INVENTION

An object of the present invention is to specify a leaf seal and a method of producing it which, in a simple manner, allow a precise distance between the leaves and at the same time realize a joint between the leaves which is distinguished by high mechanical robustness.

According to the present invention, the leaves are joined by intermediate brazing foils which at the same time are used as spacers. In this way, reliable joints between the leaves are achieved while at the same time maintaining a precise distance.

In this case, the distance between adjacent leaves is preferably determined essentially by the thickness of the brazing foil lying in between.

The invention can be realized in an especially simple manner if, according to a preferred configuration, the brazing foils consist of an alloy which has a relatively large melting interval, preferably more than 50° C. Large melting intervals result in less stringent requirements for maintaining the optimum brazing temperatures. This is crucial in order to make the process robust and to ensure constant quality of the end product.

Furthermore, it is advantageous if the leaves consist of a material which remains solid beyond the melting interval of the brazing foils. In this case, the joining or brazing operation can be carried out in a simple manner by precisely setting the brazing temperature and by keeping it constant.

A preferred configuration of the method according to the invention is characterized by the fact that brazing foils are used which consist of an alloy which has a melting interval lying between a solidus temperature and a liquidus temperature, and that the predetermined heating temperature lies only slightly above the solidus temperature.

In this case, the distance between the leaves can be set especially accurately if the brazing foils used as spacers are produced by a precision metal-foil cutting method, in particular by means of a wire erosion method or photochemical processing method.

BRIEF DESCRIPTION OF THE DRAWINGS

The invention is to be explained in more detail below with reference to exemplary embodiments in connection with the drawings, in which.

DETAILED DESCRIPTION

Figure 1:
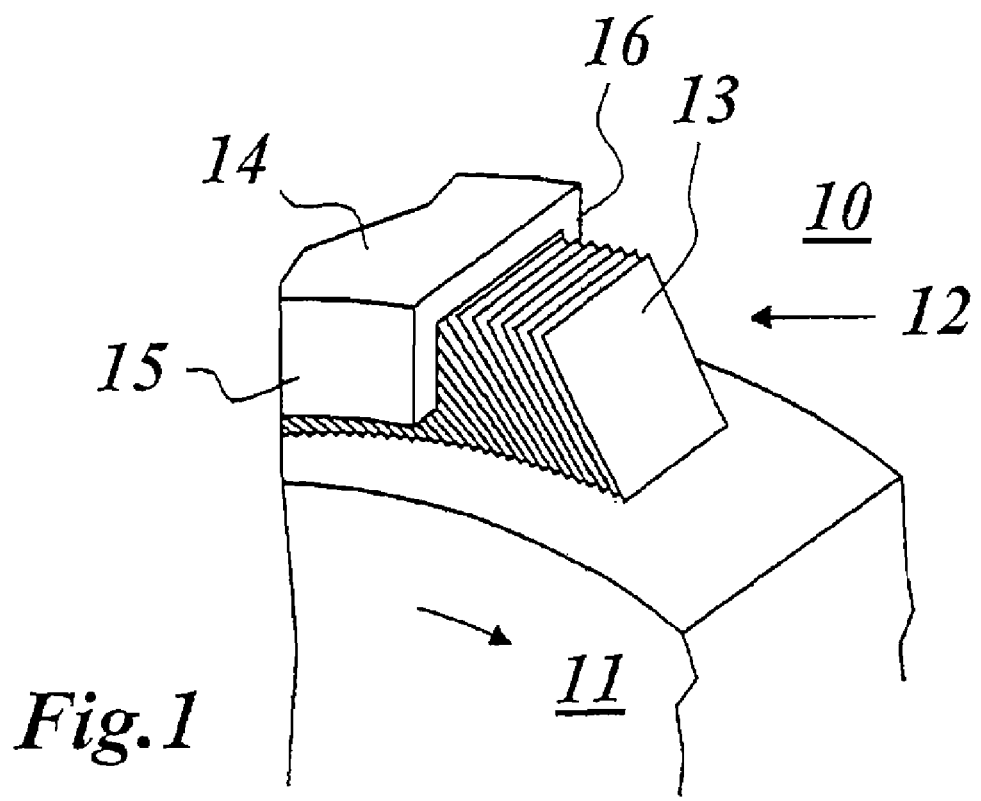
FIG. 1 shows a perspective side view of the typical construction of a leaf seal as used in a gas turbine.
Figure 7:
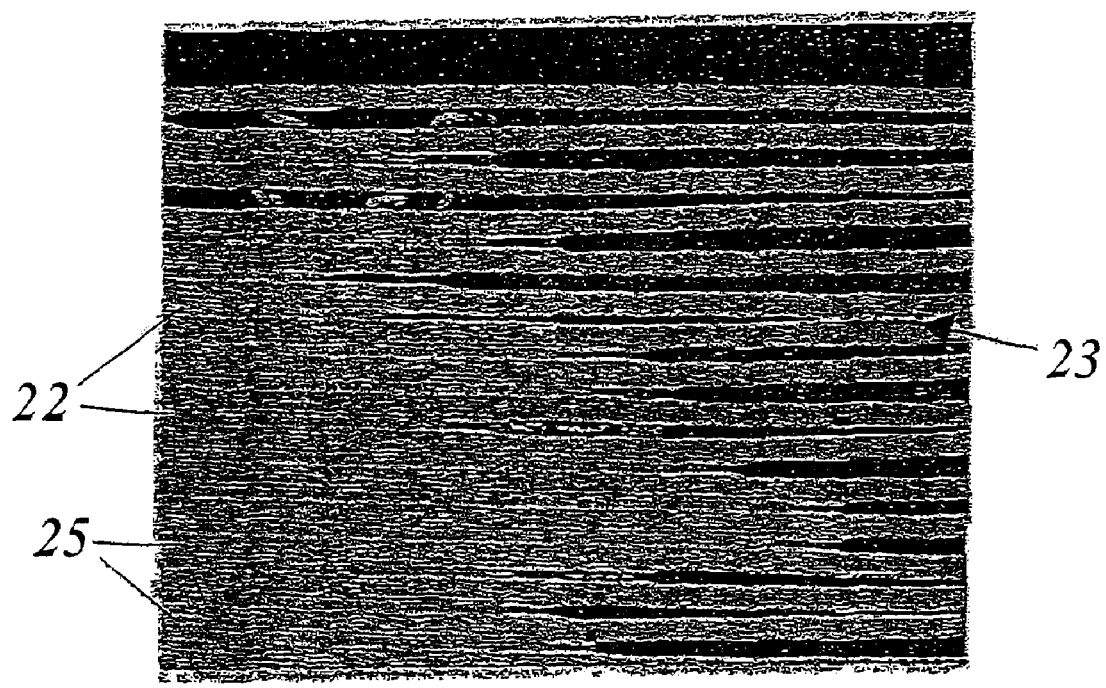
FIG. 7 shows the photograph of a brazing of leaves according to the principle according to the invention, undesirable adhesion of the leaves occurring due to the choice of a brazing temperature which is too high.
Figure 8:
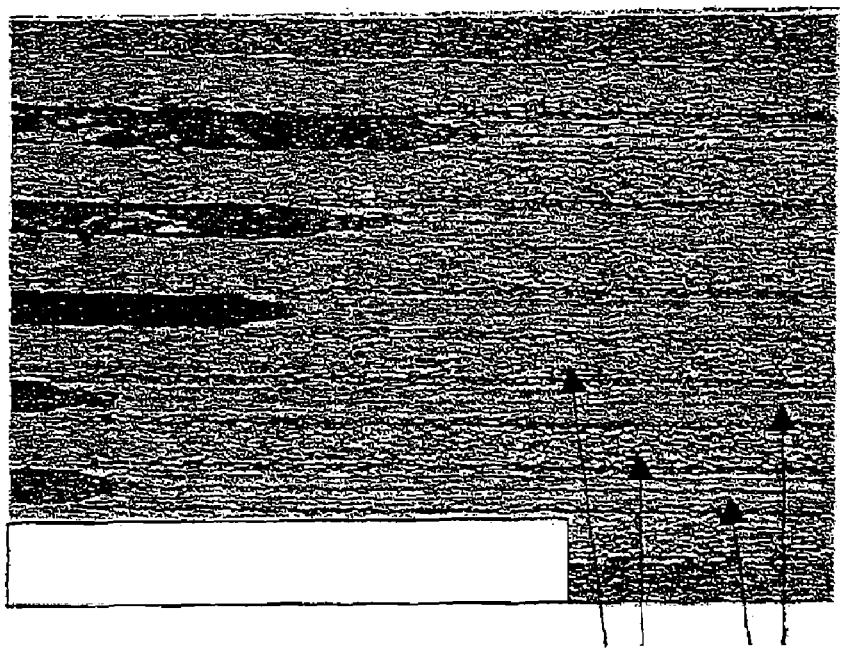
FIG. 8 shows a photograph comparable with FIG. 7 of a brazing according to the invention carried out at an optimum brazing temperature just above the solidus temperature.

Shown in FIG. 1 in a perspective side view is a typical construction of a leaf seal as used in a gas turbine. The leaf seal 12 seals a rotor shaft 11, rotating in the arrow direction, of the gas turbine 10 with respect to a housing 14. A stack of tightly spaced-apart thin leaves 13 is arranged in a ring in the circular ring-shaped intermediate space between the rotor shaft 11 and the housing 14. With their surface, the leaves 13 are oriented parallel to the axis of rotation of the machine. According to FIG. 2, the leaves are tilted from the radial direction by an angle w1 and have a narrow gap or intermediate space 18 between them, which is preferably established by spacers 17 arranged between the leaves 13. FIG. 7 and FIG. 8 each show the situation in which the spacers have been produced from brazing foil 22 and placed between the leaves 13.

Figure 3:
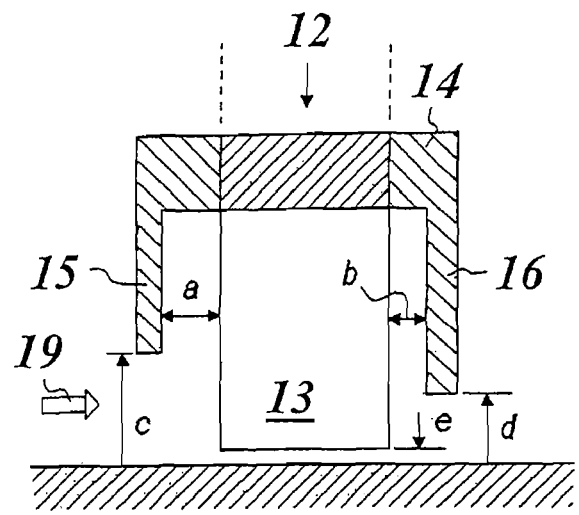
FIG. 3 shows the view of a leaf seal, comparable with FIG. 1, in the circumferential direction, with a front and a rear end plate.

According to FIGS. 1 and 3, the air flow through the leaves 13 can be varied by using a front and a rear end plate 15 and 16, respectively, which leave a narrow gap free between the surfaces of the leaf stack and the end plates 15, 16 (distances a and b in FIG. 3). A careful design of these geometries makes it possible to control the upward or downward blowing effects mentioned at the beginning. It may also be desirable to assist the downward blowing effect by an active pressure feed along the length of the leaves or inward from the front side or from the rear directions.

One of the other main advantages of the leaf seal concept shown in FIG. 1 or 3 is a greater tolerance of the radial movement than in labyrinth or brush seals. This requires a large distance between the inside diameter of the front and rear end plates 15, 16 and the rotor shaft 11 (distances c and d in FIG. 3). The gap between the leaves 13 and the rotor shaft (distance e in FIG. 3) is only a few microns.

The present invention relates to the joining process during the manufacture of leaf seals. In principle, however, it could also be used in other similar joining applications in which there are difficulties in allowing the brazing alloy to flow to the correct locations. The leaves for leaf seals are normally between 20 and 200 μm thick, and the air gaps between the leaves are typically within the same order of magnitude. In conventional brazing techniques, the joining of such a structure is achieved by the flow of liquid brazing material between the leaves. However, since the capillary forces on which this process is based depend to a considerable extent on the gap width, the flow of the brazing alloy is difficult to control.

Figure 5:
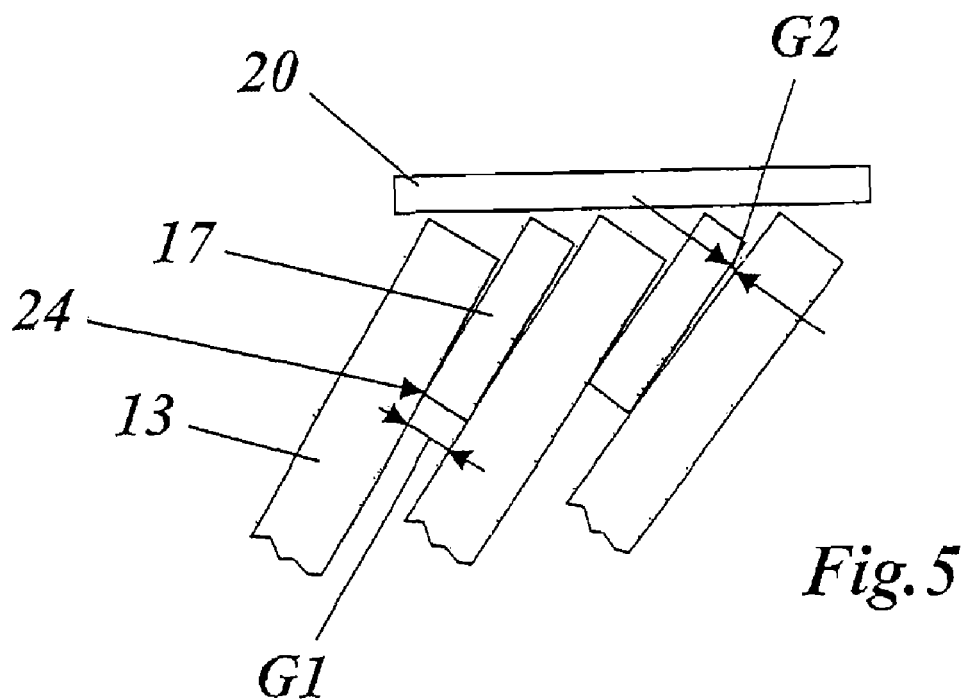
FIG. 5 shows the detail of a conventional configuration for brazing the leaves (and spacers) of a leaf seal.
Figure 6:
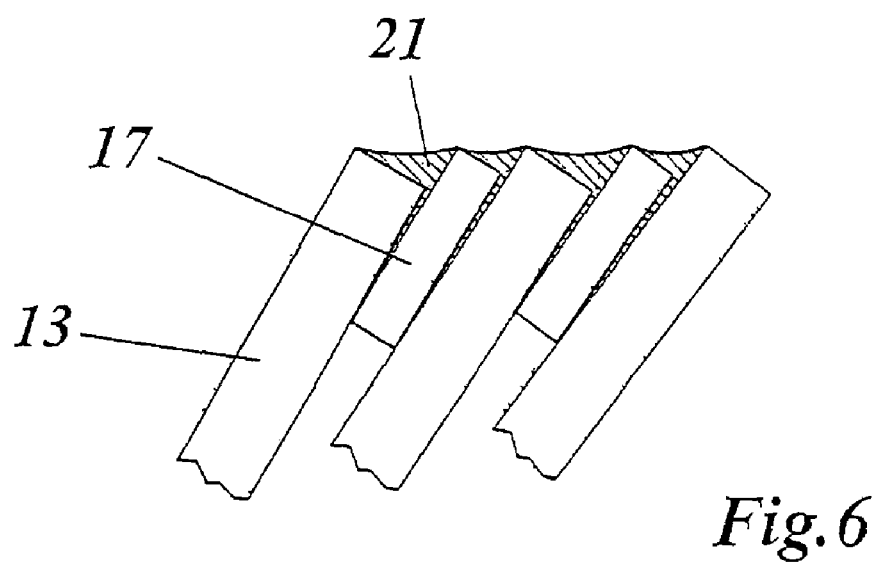
FIG. 6 shows the final state, emerging from the configuration according to FIG. 5, of the leaf seal.

This can be made clear taking FIGS. 5 and 6 as an example. Shown in both figures are obliquely arranged leaves 13 of a leaf seal which are spaced apart by spacers 17 and therefore have gaps G1 (of typically 50 μm). In the case of leaves 13 and spacers 17 of constant thickness, the annular form of the leaf seal results in wedge-shaped gaps G2 (in the order of magnitude of 5-10 μm) between the spacers 17 and leaves 13, these gaps G2 extending down to the metal-to-metal contacts 24. If the leaves 13 and spacers 17 are to be brazed to one another in the position shown, a brazing foil (or paste) 20 is put onto the outside in the conventional brazing method (FIG. 5).

In conventional brazing, the brazing alloy of the brazing foil 20 starts the joining process far away from the surfaces to be joined and reaches its final position only by a capillary flow on account of the surface tension into the gaps G2, where, as solidified brazing alloy 21, it then produces the joint (FIG. 6). The problem with the geometry of the leaf seal is that the surfaces which are to be joined are too close to one another for the conventional brazing technique in order to allow penetration of the liquid brazing alloy. It can be difficult to obtain a sound, strong brazed joint at the correct place. In addition, the leaves must maintain an air gap (G1) which extends down over most of their length. This air gap normally lies in the middle of the optimum region for the capillary forces in order to draw in the brazing alloy. Should this gap be filled with liquid brazing alloy, this would be disastrous for the leaf seal.

As illustrated schematically in FIGS. 5 and 6 with typical, illustrative masses, the brazing process, in a conventional procedure, would include the alternating composition of the leaves 13 and separate spacers 17 and also a source of brazing alloy (brazing foil 20) placed in the vicinity, this brazing alloy being ready to flow to the appropriate locations when it melts.

It is clear that a similar effect can be achieved with leaf components which have a thickened section which acts as an integral spacer, although less brazing alloy would be required here in order to achieve a joint.

In this example, the brazing alloy would have to start on its path to its desired final position by flowing through a gap (G2) having a width of 5 to 10 μm, which then decreases to zero (at the metal-to-metal contact 24). When it gets to there, namely to the metal-to-metal contact points of the leaves 13 and spacers 17, it has to stop before it flows down into the air gap (G1). It is essential for the functionality of the leaf seal that the air gap is not filled with brazing alloy.

Commercial brazing alloys are based on optimum brazing gaps of between 10 to 150 μm. The best that one can hope for under these circumstances is that the liquid brazing alloy starts to flow into the gaps G2 between the leaves 13 and the spacers 17, these gaps G2 normally being between 5 and 10 μm. The flowing-in of the brazing alloy right down to the end of the gap would probably be difficult to ensure, even under the best possible wetting conditions. On the other hand, the air gap (G1) between the leaves is normally in the middle of the optimum region, so that it is just as difficult to ensure that the liquid brazing alloy does not flow in.

Furthermore, brazing alloys are often similar to the alloys (of the leaves) which they are to join, except that they are alloyed with elements lowering the melting point, such as boron or silicon for example. These additives give the alloy the desired melting properties.

The present invention is based, inter alia, on deriving advantages from the melting properties of at least some brazing alloys:

After heating, a pure metal starts to melt at its melting temperature, and any possible increase in the rate of heat supply merely leads to an increased rate of melting, and not to an increase in the temperature. Finally, the entire metal is liquid, and only then does the temperature of the liquid metal start to increase further. Pure metals have well-defined, isothermal melting points. In contrast, most alloys melt above a temperature range (melting interval). After the heating, the alloy starts to melt at a temperature which is known as the solidus temperature. At this point, the quantity of the liquid metal present is infinitesimal, but it remains in equilibrium with the solid metal around it, to be precise as long as there is no change in the temperature (or in the composition of the alloy). After further heating, the temperature of the semi-liquid alloy increases in the same way as the proportion of the liquid which is in equilibrium with the solid material. This continues until the entire alloy is liquid, which takes place at the liquidus temperature; after that, the temperature increases in the same way as in a pure metal.

Figure 4:
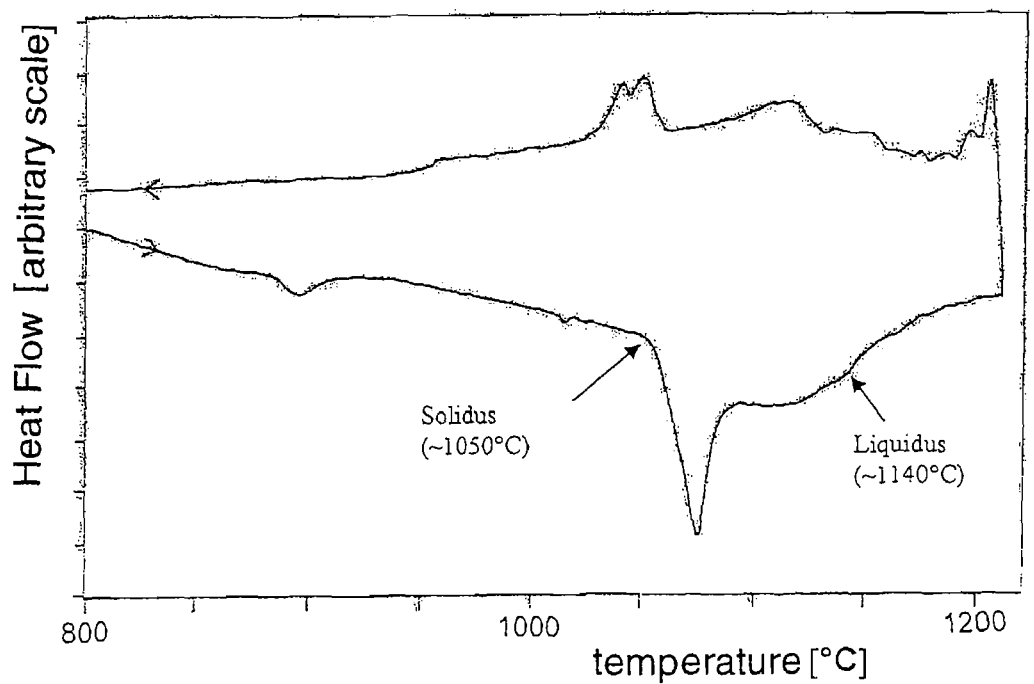
FIG. 4 shows the DTA (differential thermal analysis) measuring curve of a typical brazing alloy as used for the present invention.

This can be measured analytically with the differential thermal analysis (DTA). This uses the net heat flow into a specimen of the alloy or from the specimen in order to record the start and termination of the metallurgical reactions, such as the melting for example. Discontinuities in the heat flow are in this case an indication that either an endothermic or an exothermic reaction is taking place. An example of a commercial Ni-based brazing alloy is shown in FIG. 4.

At any temperature between the solidus temperature and the liquidus temperature, the ratio of solid proportions to liquid proportions remains the same if the alloy is kept at a constant temperature. This state, in theory, will continue indefinitely, provided the composition of the alloy does not change due to diffusion or possible volatility mechanisms. A change in the temperature within the limits of the solidus-liquidus range (melting interval) changes the ratio of solid to liquid. This is the basis of the present invention.

Figure 2:
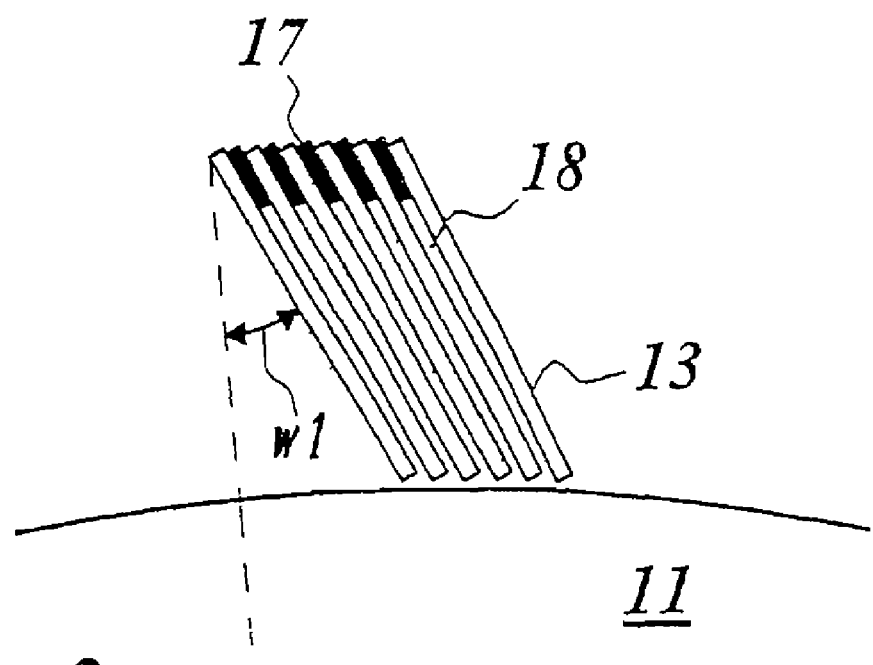
FIG. 2 shows, in the axial direction, the side view of the arrangement, inclined from the radial direction, of individual leaves with their intermediate spacers.

Alternating layers of leaves and spacers are assembled in a manner similar to FIG. 2 in a suitable clamping device (not shown) which can withstand the temperatures of the brazing process. In the present case, however, the spacers consist of the brazing alloy itself. It is crucial that the spacer maintains its thickness in order to provide an air gap (G1 in FIG. 5) between the leaves. At the same time, however, sufficiently liquid metal must be produced in order to ensure a reliable metallurgical bond between adjacent leaves. In this respect, the control of the temperature is obviously especially critical. However, the use of a brazing alloy with a wide melting interval can help to reduce the sensitivity to temperature changes. In the case of the DTA curve shown further above, the melting range is, for example, over 90° C. Brazing alloys with a melting interval >50° C. are preferably to be used.

Exact control of the position and quantity of the brazing alloy can be achieved by using a precision cutting method for metal foils, such as, for example, wire erosion or photochemical processing, for forming the brazing alloy.

Photographs are reproduced in FIGS. 7 and 8 in order to show the results of the brazing method according to the invention applied to leaf seals. Shown here viewed from the side are leaves 25 which are connected to one another and spaced apart by brazing foils 22. In FIG. 7, the brazing temperature was higher and thus closer to the conventional brazing temperature.

It can be seen in FIG. 7 that, if a brazing temperature which is too high is used, the combination of the increased liquid proportion, the increased fluidity of the liquid, and the increased wetting of the leaf surface causes intensified migration of the liquid down the length of the leaf (to the right in FIG. 7). In some cases, this even leads to adhesion of the leaves 21 in the form of an adhesion point 23 which is remote from the original starting position of the brazing alloy. In conventional brazing, during which the brazing temperatures are even higher than in the example shown in FIG. 7, the adverse effects are even more pronounced.

However, if the temperature is controlled sufficiently effectively (FIG. 8), the liquid wetting is just sufficient in order to permit the forming of a sound joint. Under these conditions, the remaining strength of the remaining solid brazing alloy in the brazing foils 22 is sufficiently high in order to avoid changes in shape (in particular changes in the thickness) and penetration, caused by capillary forces, of liquid material between the leaves. After cooling, the distance between the leaves 25 in this procedure corresponds exactly to the value established by the original thickness of the brazing foils 22.

What is claimed is:

1. A leaf seal for sealing a shaft rotating about an axis, the leaf seal comprising:
    a plurality leaves spaced-apart from each other and arranged in a concentric circle around the axis such that surfaces of the leaves are oriented essentially parallel to the axis;
    a plurality of intermediate spacers, each spacer including a brazing foil and being disposed between two of the plurality of leaves, wherein the plurality of leaves are brazed to one another via the intermediate spacers so as to provide a brazed joint of a brazing alloy from the brazing foils.

2. The leaf seal as recited in claim 1, wherein a thickness of the brazing foil disposed between adjacent leaves essentially determines a distance between adjacent leaves.

3. The leaf seal as recited in claim 1, wherein the brazing alloy has a melting interval.

4. The leaf seal as recited in claim 3, wherein the melting interval is >50° C.

5. The leaf seal as recited in claim 3, wherein the leaves are made of a material which remains solid beyond the melting interval of the brazing foils.

6. The leaf seal as recited in claim 1, wherein the shaft is a gas turbine shaft.

7. A method for producing a leaf seal for sealing a shaft rotating about an axis, the method comprising:
   disposing a plurality of brazing foils as spacers between a plurality of leaves and arranging the leaves in a concentric circle around the axis such that surfaces of the leaves are oriented essentially parallel to the axis;
   heating the leaves and spacers to a predetermined temperature at which the brazing foils partially melt and wet the respectively adjoining leaves while largely maintaining their thickness.

8. The method as recited in claim 7, wherein the brazing foils are made of an alloy having a melting interval between a solidus temperature and a liquidus temperature, and wherein the predetermined temperature lies slightly above the solidus temperature.

9. The method as recited in claim 7, further comprising producing the brazing foils using a precision metal-foil cutting or punching method.

10. The method as recited in claim 7, further comprising producing the brazing foils using a wire erosion method or photochemical processing method.

\* \* \* \* \*